HYDRAULIC APPARATUS

Original Filed June 19, 1943 2 Sheets-Sheet 1

INVENTOR
FRED J. WRIGHT
BY
Warren T. Schmieding
ATTORNEY

HYDRAULIC APPARATUS

Original Filed June 19, 1943 2 Sheets-Sheet 2

INVENTOR
FRED J. WRIGHT
BY
Warren N. Holchmieding
ATTORNEY

United States Patent Office

Re. 24,048

Reissued Aug. 2, 1955

24,048

HYDRAULIC APPARATUS

Fred J. Wright, Columbus, Ohio, assignor to The Denison Engineering Company, Columbus, Ohio, a corporation of Ohio Original No. 2,480,069, dated August 23, 1949, Serial No. 491,498, June 19, 1943. Application for reissue August 22, 1950, Serial No. 180,781

9 Claims. (Cl. 103—162)

Matter enclosed in heavy brackets [ ] appears in the original patent but forms no part of this reissue specification; matter printed in italics indicates the additions made by reissue.

The present invention relates to fluid pressure energy translating devices such as hydraulic motors and pumps and more particularly to motors and pumps employing a cylinder barrel, reciprocating pistons therein and an associated angularly disposed thrust plate or ring which, when relative rotation is imparted between the elements of the motor or pump, causes reciprocation of the pistons.

One of the objects of the present invention is to provide a translating device of the above mentioned type in which the driving connection, between the barrel and shaft, is disposed so that the resultant forces of thrusts, created by the association of the pistons with the thrust ring, pass from the barrel to the shaft at the connection.

In translating devices of the type above mentioned, a shaft is employed for driving the barrel when the device functions as a pump or the shaft is driven by the barrel when the device functions as a motor. A driving connection, such as a spline, is interposed between the barrel and shaft.

Another object of the present invention is to provide a hydraulic pump, or motor, comprising a barrel having one or more cylinders formed therein, and pistons in the cylinders, the pistons being forced outwardly against piston actuating mechanism by a spring, which spring reacts against the barrel for urging the barrel into frictional engagement with a member having ports for supplying liquid to and directing the liquid from the cylinders.

Another object of the invention is to provide a coil spring for reacting between the cylinder barrel of a pump, or motor, and the piston in a cylinder of the cylinder barrel, which spring is mounted at one end on a friction reducing bearing.

Further objects and advantages of the present invention will be apparent from the following description, reference being had to the accompanying drawings wherein a preferred form of embodiment of the invention is clearly shown.

Although the present invention is directed broadly to fluid pressure energy translating devices such as fluid motors or fluid pumps, I have shown the same as a hydraulic pump merely for the purpose of illustrating one embodiment of the invention.

Figure 1:
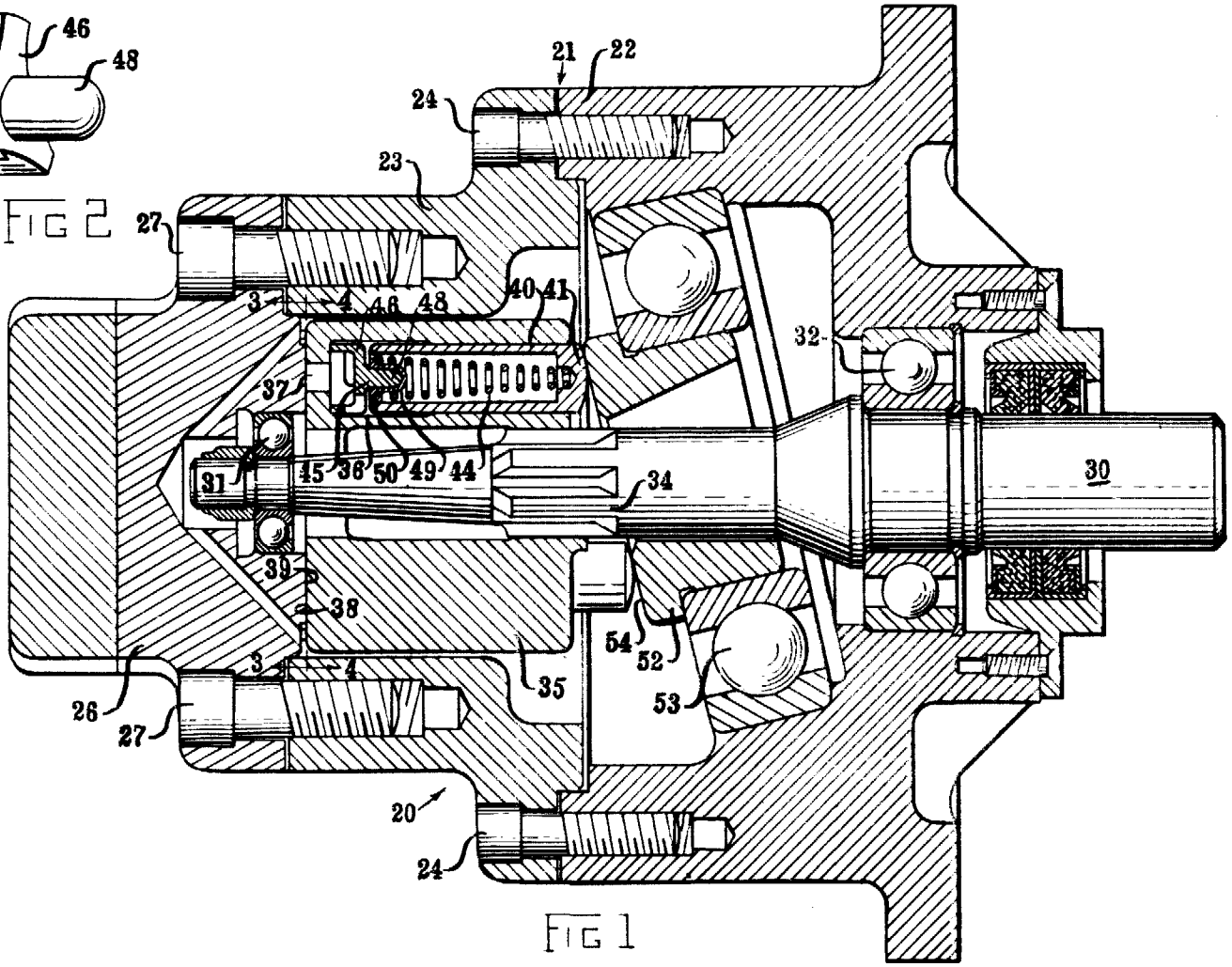
Fig. 1 is a view, partly in section, of a hydraulic pump embodying the invention.
Figure 2:
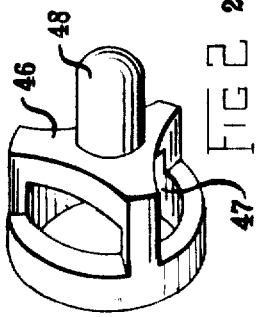
Fig. 2 is a perspective view of a spring support member.

Referring to the drawings, I have shown a hydraulic pump 20 comprising a housing 21 formed by cylindrical housing sections 22 and 23 joined together by bolts 24. One end of the section 23 is closed by a cap or port plate 26, which plate is attached to the housing by bolts 27. A drive shaft 30 is journaled at one end in a bearing 31 in the plate 26 and adjacent the other end by a bearing 32, which bearing is in the housing section 22. The shaft 30 is splined at 34 and a barrel 35 is keyed to the shaft 30 by the splines 34. The barrel 35 is disposed in housing member 23 and is provided with a plurality of cylinders, one of which is shown in Fig. 1 at 36, which cylinders extend parallel with the axis of the barrel and are spaced equally from one another about the barrel and at equal distance from the axis of the barrel. Each of the cylinders 36 has a port 37 leading from the end face 38 of the barrel 35 to the cylinder through which liquid is taken into and discharged from the cylinder. The face 38 of the barrel is maintained in frictional engagement with the face 39 of the port plate 26 as will be more fully explained hereinafter.

A cylindrically shaped piston 40 is provided for each cylinder, which piston is closed at 41, the opposite end being open. The outer end 41 of the pistons 40 are shaped spheroidally, the purpose of which will appear hereinafter. Coil springs, one of which is shown at 44, are disposed within the pistons 40, an end of each spring abuts the closed end 41 of a piston and the opposite end being supported by freely rotatable bearings 45. The bearings 45, only one being shown, each comprise an open end spring retainer support 46 disposed in a cylinder 36 and having three openings 47 in the sides and a spindle 48 extending from the closed end thereof. The open end of the support 46 abuts the end of the cylinder 36 and surrounds the port 37. The openings 47 form passages through which the liquid passes to and from the cylinders. A spring retainer in the form of a thimble 49 is rotatably supported on the spindle, and the spring 44 abuts a peripheral flange 50 of the thimble 49. The end of the spindle 48 is *spheroidally* [spheroidically] shaped and the side walls and end are highly polished; likewise the inside of the thimble 59 is highly polished so that the thimble 49 rotates freely on the spindle. Since the liquid handled by the pump is oil, the bearing is well lubricated.

A *cylindrically* [cylindrical] thrust plate 52 is rotatably supported by and within the housing section 22 by a ball bearing 53. The plate 52 is supported so that the axis thereof is tilted with respect to the axis of the cylinder barrel 35. The pistons 40 are biased outwardly and into engagement with the face 54 of the plate 52. It is apparent that when the drive shaft 30 is rotated, the cylinder barrel 35 will be rotated and the springs 44, together with the camming effect of the plate 52, will cause the pistons 40 to be reciprocated in the cylinders 36.

The end cap or port plate 26 is provided with arcuate oil inlet and outlet ports 55 and 56 in the face 39 thereof, and the ports 37 of the cylinders 36 progressively register, first with one of these ports and then the other as the barrel 35 rotates so that oil is drawn into the cylinders 36 as the pistons 40 move outwardly, and, as the pistons are moved inwardly, the oil in the cylinders 36 is forced out through the other arcuate port. The ports are connected with conduits, not shown, for directing the oil to and from the pump.

*It will be apparent from the foregoing description, and the drawings, that the cylinder barrel 35 is contained within and is wholly unsupported by the casing or hous-*

Figure 5:
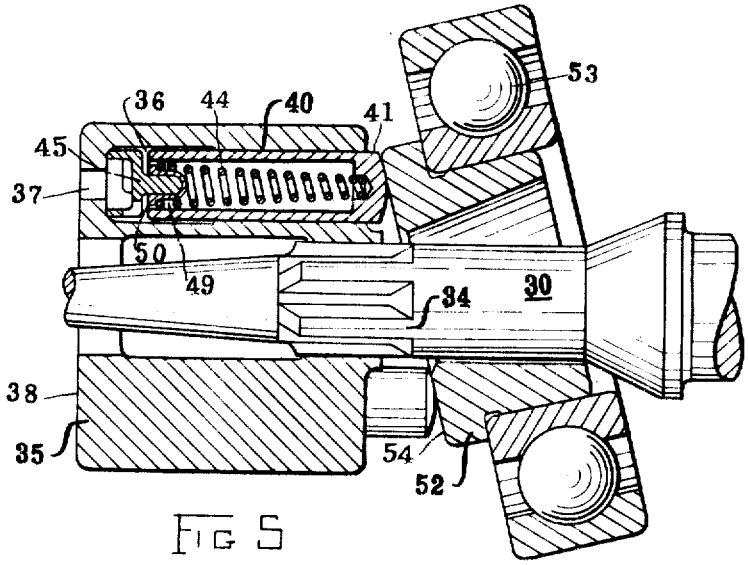
Fig. 5 is a view similar to Fig. 1 but illustrates more clearly one of the features of the invention.
Figure 3:
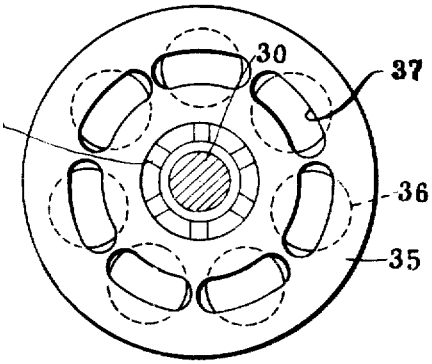
Fig. 3 is an end view of the cylinder barrel as viewed on the line 3—3 of Fig. 1.

*ing except through the port plate 26 and that shaft 30 which extends through the central axial opening in the cylinder barrel is spaced substantially from the walls of this central opening throughout the larger portion of the length of the latter. Also, as clearly shown in the drawings, the cylinder barrel 35 is wholly unsupported by the shaft 30 except at that end of it which is remote from the port plate 26 and at said end it is connected to the shaft 30 through a motion permitting spline connector means. As clearly indicated in the drawings, this motion connector means includes straight splines which extend axially along the shaft 30 and spline means carried by the cylinder barrel 35 which interfit with the spline means on the shaft 30 to provide the slidable connection above referred to. It will be apparent that by following ordinary machine shop practices in forming the splines of both the cylinder barrel and the shaft so that they will be slidable one on the other that a slidable motion permitting connector between the cylinder barrel and shaft will be provided which will also permit a small amount of bending or bowing of the shaft 30 between the bearings 31 and 32 without causing the cylinder barrel 35 to become locked to the shaft 30 when the latter is under loads sufficient to bend or bow the shaft. This is another important feature of the invention since it has been found in practice where the cylinder barrel and shaft do become locked as above described, that the bending of the shaft will cause separation of the cylinder barrel and port plate. It will be apparent that the length of the cooperating surfaces of the spline connection between the cylinder barrel and shaft should be of as short a length as feasible to permit bending or bowing of the shaft without causing the seal between the cylinder barrel and port plate to become broken and that as indicated in Figs. 1 and 5 of the drawings, it is preferred that the length of the contacting portions of the splines on the cylinder barrel and shaft be less than one-third the overall length of the cylinder barrel.*

Since the cylinder barrel 35 is capable of longitudinal movement on the drive shaft 24, it is necessary to cause the barrel to be urged against the face 39 of the port plate 26 during starting of the pump for sealing the passages between the arcuate ports of the port plate and the ports of the cylinders. By abutting one end of the springs 44 with the cylinder barrel 35 and the opposite ends of the springs with the pistons 30, the springs provide a reacting force between the plate 52 and the barrel for urging the barrel against the face 39. After the pistons 40 have commenced to pump oil, the pressure of the oil against the port end of the cylinders urges the barrel 35 into contact with the face 39 of the port plate.

By forming the ends 31 of the pistons 40 spheroidally, a minimum of area of the piston will engage the plate 52 thereby minimizing friction. It is apparent that the ends of the pistons will engage the face 54 of the plate 52 at one side of the *axes* [axis] of the pistons and when the barrel 35 rotates, the pistons will be rotated about their axes. Since the springs 44 connect directly with the pistons 40, although merely by friction, the springs will have a tendency to rotate about their axis with the pistons. By supporting the opposite ends of the springs by a bearing which is freely rotatable, the springs will rotate with the pistons and are, therefore, not subject to an appreciable torsional strain, and there is no frictional sliding between the pistons and springs. This lengthens the effective life of the springs and prevents wearing on the inside of the pistons.

Figure 6:
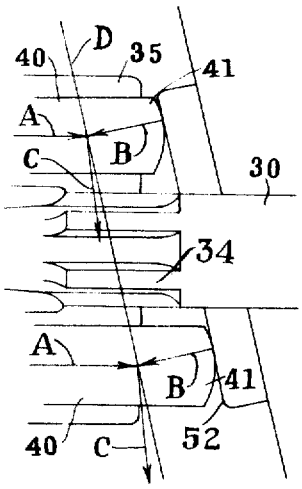
Fig. 6 is a diagrammatic view showing the relation of the cylinder barrel and pistons to the thrust ring and the forces acting on these elements during the operation of the device.
Figure 4:
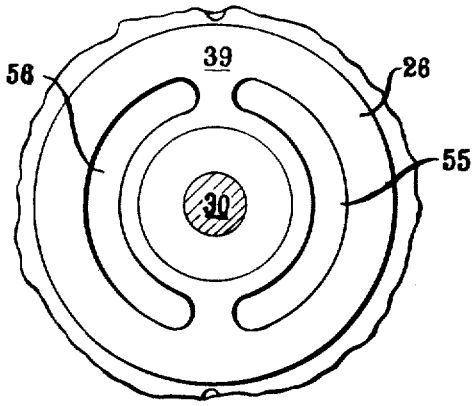
Fig. 4 is an end view of the port plate as viewed on line 4—4 of Fig. 1.

Referring particularly to Fig. 6, it will be seen that the spline connection 34, between the shaft 30 and barrel 36, is disposed where the resultant of the components of the thrusts, created by the relationship of the pistons 40 and the thrust plate 52, is transferred from the barrel to the shaft. This is apparent since there are two components of force acting on each piston, these being indicated by lines "A" and "B." The resultant force on each piston is indicated by a line "C." The length of line "B" is determined by the center of the radius for the spheroidical end 41 of the piston. These centers are indicated by "D." The starting points or nucleuses of the resultant forces fall within a plane "D." Therefore, the seven resultant forces indicated by the lines "C" of the component forces "A" and "B," fall axially within the confines of the spline connection 34.

By arranging the spline as herein disclosed, the resultant forces transmitted between the barrel and shaft are all substantially downwardly, as viewed in Fig. 6, with the result that the resultant force urging the face of the barrel against the face of the port plate is substantially parallel with the axis of the barrel, that is, the resultant force, created by the association of the pistons with the thrust ring, is substantially at right angles to the engaging faces of the barrel and port plate. Consequently, torsional strain at these faces is reduced to a minimum. Moreover the thrust between the thrust ring and the piston is at right angles to the ring and thereby wear on the ends of the pistons, the thrust ring and the bearings for the latter is reduced to a minimum.

While the form of embodiment of the present invention as herein disclosed constitutes a preferred form, it is to be understood that other forms might be adopted, all coming within the scope of the claims which follow.

I claim:

1. A fluid pressure energy translating device comprising a cylinder barrel having a plurality of piston chambers with ports adjacent one end thereof; pistons disposed in said chambers, said pistons comprising cylindrical members closed at one end and open at the opposite end, said open ends facing toward the ends of the chamber provided with said *ports* [parts]; coil springs having one end thereof extending into said pistons and connected therewith; bearing members comprising base elements abutting said ported ends of said chambers, said base elements being open for the passage of fluid therearound; and means forming rotatable connections between said base elements and said springs.

2. A fluid pressure energy translating device comprising a cylinder barrel having a plurality of piston chambers with ports adjacent the inner ends thereof; pistons slidably mounted in said chambers, said pistons, being hollow and having closed ends projecting from said chambers; tapered coil springs disposed within said pistons; means at the closed ends of said pistons for locating the small end of the springs in spaced relation from the side walls of said pistons; bearing members abutting the ported ends of said chambers, said bearing members being open for the passage of fluid therethrough, and means on said bearing members for rotatably supporting the other ends of said springs in spaced relation from the walls of said pistons.

3. A fluid pressure energy translating device comprising a cylinder barrel having a plurality of piston chambers with ports adjacent the inner ends thereof; pistons slidably mounted in said cylinders, said pistons being hollow and having closed ends projecting from said chambers; tapered coil springs disposed in said chambers; means for preventing the engagement between said springs and the side walls of said pistons, said means having base elements disposed at one end of said chambers; means on said base elements for rotatably supporting and locating one end of said springs; and, means frictionally engaging the springs at the opposite ends of the chambers for holding the springs away from the piston side walls.

4. A fluid pressure energy translating device comprising a cylinder barrel having a plurality of piston chambers with ports adjacent the inner ends thereof; pistons slidably mounted in said cylinders, said pistons being hollow and having closed ends projecting from said chambers; tapered coil springs disposed in said chambers; means for preventing the engagement between said springs and the side walls of said pistons, said means having sockets provided at one end of the chambers to receive the small ends of said springs; and, base members disposed at the opposite ends of said chambers, said base members having bearing and spring receiving and centering devices rotatably supported on said bearings.

[5. In a fluid motor, a casing; a port plate in said casing; a cylinder barrel disposed with one end wall in sliding engagement with said port plate, the remaining walls being spaced from the walls of said casing, said cylinder barrel having a central opening and cylinders parallel with and spaced from said opening; piston means disposed for reciprocation in said cylinders, said pistons having spheroidally shaped ends the centers of generation of which are disposed in the axial centers of said pistons; an inclined thrust member disposed in engagement with said ends of said pistons; a shaft extending into the central opening in said cylinder barrel; and a splined driving connection between said shaft and said cylinder barrel, said connection extending a limited distance on either side of a plane passing through the centers of generation of the spheroidal ends of said pistons.]

[6. In a fluid motor, a casing; a port plate in said casing; a cylinder barrel disposed with one end wall in sliding engagement with said port plate, the remaining walls thereof being spaced from the walls of said casing, said cylinder barrel having an axial opening and cylinders parallel with the longitudinal axis thereof; piston means disposed for reciprocation in said cylinders and projecting from the end of said cylinder barrel opposite that engaging said port plate; the outer ends of said pistons being spheroidally-shaped and having the centers of generation thereof in the axial centers of said pistons and near the adjacent end of said cylinder barrel; an inclined thrust member disposed in engagement with said ends of said pistons; a shaft extending into the axial opening in said cylinder barrel; and a loose splined driving connection between said shaft and said cylinder barrel, said connection being located adjacent the end of said cylinder barrel from which said pistons project.]

*7. A fluid pressure energy translating device including means forming a casing; port plate means in said casing; a cylinder barrel disposed in said casing, said cylinder barrel having outer walls and opposite ends, one of said ends being in sliding engagement with said port plate means, said cylinder barrel otherwise being at all times out of engagement with and unsupported by said casing, means in said cylinder barrel forming a central opening extending axially therein and about the axis of which said cylinder barrel rotates, and a plurality of cylinders spaced around said central opening on axes extending generally parallel to the axis of said central opening; pistons disposed for reciprocation in said cylinders, said pistons having spheroidally shaped ends the centers of generation of which are disposed on the axial centers of said pistons and cylinders; an inclined thrust member in said casing disposed in engagement with the spheroidally shaped ends of said pistons; a shaft extending in said central opening the outer surface of which is spaced substantially from the inner surfaces of said cylinder barrel opening throughout the major portion of the axial length of the latter; anti-friction bearing means in said housing at opposite ends of said cylinder barrel carrying said shaft for rotation; and a motion permitting connector means interconnecting said cylinder barrel and shaft including means forming a plurality of splines carried by said cylinder barrel and extending in the central opening thereof from adjacent the end thereof remote from said port plate means for a distance of less than one-third the total length of said cylinder barrel, and means on said shaft forming a plurality of circumferentially spaced straight splines extending axially of said shaft and interfitting with said splines carried by said cylinder barrel and being of greater length than the latter, said splines carried by said cylinder barrel having a length such that they extend a limited distance on each side of a plane passing through the centers of generation of the spheroidally shaped ends of said pistons.*

*8. A fluid pressure energy translating device including means forming a casing; port plate means in said casing; a cylinder barrel disposed in said casing, said cylinder barrel having outer walls and opposite ends, one of said ends being in sliding engagement with said port plate means, said cylinder barrel otherwise being at all times out of engagement with and unsupported by said casing, means in said cylinder barrel forming a central opening extending axially therein and about the axis of which said cylinder barrel rotates, and a plurality of cylinders spaced around said central opening on axes extending generally parallel to the axis of said central opening; pistons disposed for reciprocation in said cylinders, said pistons having spheroidally shaped ends the centers of generation of which are disposed on the axial centers of said pistons and cylinders; an inclined thrust member in said casing disposed in engagement with the spheroidally shaped ends of said pistons; a shaft extending in said central opening the outer surface of which is spaced substantially from the inner surfaces of said cylinder barrel opening throughout the major portion of the axial length of the latter; bearing means in said housing carrying said shaft for rotation; and a motion permitting connector means interconnecting said cylinder barrel and shaft including means forming a plurality of splines carried by said cylinder barrel and extending in the central opening thereof from adjacent the end thereof remote from said port plate means for a distance of less than one-third the total length of said cylinder barrel, and means on said shaft forming a plurality of circumferentially spaced straight splines extending axially of said shaft and interfitting with said splines carried by said cylinder barrel and being of greater length than the latter, said splines carried by said cylinder barrel having a length such that they extend a limited distance on each side of a plane passing through the centers of generation of the spheroidally shaped ends of said pistons.*

*9. A fluid pressure energy translating device including means forming a casing; port plate means in said casing; a cylinder barrel disposed in said casing, said cylinder barrel having outer walls and opposite ends, one of said ends being in sliding engagement with said port plate means, said cylinder barrel otherwise being at all times out of engagement with and unsupported by said casing, means in said cylinder barrel forming a central opening extending axially therein and about the axis of which said cylinder barrel rotates, and a plurality of cylinders spaced around said central opening on axes extending generally parallel to the axis of said central opening; pistons disposed for reciprocation in said cylinders, said pistons having spheroidally shaped ends the centers of generation of which are disposed on the axial centers of said pistons and cylinders; an inclined thrust member in said casing disposed in engagement with the spheroidally shaped ends of said pistons; a shaft extending in said central opening the outer surface of which is spaced substantially from the inner surfaces of said cylinder barrel opening throughout the major portion of the axial length of the latter; bearing means in said housing carrying said shaft for rotation; and motion permitting connector means interconnecting said cylinder barrel and shaft including means forming a plurality of splines carried by said cylinder barrel and extending axially of the central opening thereof from adjacent the end thereof remote from said port plate means for a distance of less than one-third the total length of said cylinder barrel, and means on a shaft forming a plurality of circumferentially spaced straight splines extending axially of said shaft and interfitting with said splines carried by said cylinder barrel, said splines carried by said cylinder barrel having a length such that they extend a limited distance on each side of a plane passing through the centers of generation of the spheroidally shaped ends of said pistons.*

*10. A fluid pressure energy translating device including means forming a casing; port plate means in said casing; a cylinder barrel disposed in said casing, said cylinder barrel having outer walls and opposite ends, one of said ends being in sliding engagement with said port plate means, said cylinder barrel otherwise being at all times out of engagement with and unsupported by said casing, means in said cylinder barrel forming a central opening extending axially therein and about the axis of which said cylinder barrel rotates, and a plurality of cylinders spaced around said central opening on axes extending generally parallel to the axis of said central opening; pistons disposed for reciprocation in said cylinders, said pistons having spheroidally shaped ends the centers of generation of which are disposed on the axial centers of said pistons and cylinders; an inclined thrust member in said casing disposed in engagement with the pheroidally shaped ends of said pistons; a shaft extending in said central opening the outer surface of which is spaced substantially from the inner surfaces of said cylinder barrel opening throughout the major portion of the axial length of the latter; bearing means in said housing carrying said shaft for rotation; and a motion permitting connector means interconnecting said cylinder barrel and shaft including means forming a plurality of splines carried by said cylinder barrel and extending in the central opening thereof from adjacent the end thereof remote from said port plate means, and means on said shaft forming a plurality of circumferentially spaced straight splines extending axially of said shaft cooperating with said splines carried by said cylinder, said cylinder and shaft splines having cooperating interconnecting surfaces of substantially less axial length than one-third the overall length of said cylinder barrel, and the length of said cylinder barrel splines being such that they extend a limited distance on each side of a plane passing through the centers of generation of the spheroidally shaped ends of said pistons.*

*11. A fluid pressure energy translating device including means forming a casing; port plate means in said casing; a cylinder barrel disposed in said casing, said cylinder barrel having outer walls and opposite ends, one of said ends being in sliding engagement with said port plate means, said cylinder barrel otherwise being at all times out of engagement with and unsupported by said casing, means in said cylinder barrel forming a central opening extending axially therein and about the axis of which said cylinder barrel rotates, and a plurality of cylinders spaced around said central opening on axes extending generally parallel to the axis of said central opening;*

*pistons disposed for reciprocation in said cylinders, said pistons having spheroidally shaped ends the centers of generation of which are disposed on the axial centers of said pistons and cylinders; an inclined thrust member in said casing disposed in engagement with the spheroidally shaped ends of said pistons; a shaft extending in said central opening the outer surface of which is spaced substantially from the inner surfaces of said cylinder barrel opening throughout the major portion of the axial length of the latter; bearing means in said housing carrying said shaft for rotation; and a motion permitting connector means interconnecting said cylinder barrel and shaft including means forming a plurality of splines carried by said cylinder barrel and extending in the central opening thereof from adjacent the end thereof remote from said port plate means, and means on said shaft forming a plurality of circumferentially spaced straight splines extending axially of said shaft cooperating with said splines carried by said cylinder, said cylinder and straight shaft splines having cooperating interconnecting surfaces of substantially less axial length than one-third the overall length of said cylinder barrel.*

References Cited in the file of this patent or the original patent.

UNITED STATES PATENTS

| | | |
|---|---|---|
| 924,787 | Janney | June 15, 1909 |
| 1,263,180 | Williams | Apr. 16, 1918 |
| 1,539,616 | Williams | May 26, 1925 |
| 1,817,080 | Howard | Aug. 4, 1931 |
| 1,820,266 | Bilderdeck | Aug. 25, 1931 |
| 1,840,866 | Rayburn et al. | Jan. 12, 1932 |
| 1,924,738 | Flanders | Aug. 29, 1933 |
| 1,970,133 | Ferris et al. | Aug. 14, 1934 |
| 2,071,800 | Mock | Feb. 23, 1937 |
| 2,093,477 | Parsons | Sept. 21, 1937 |
| 2,096,907 | Linderman | Oct. 26, 1937 |
| 2,107,079 | Mentele | Feb. 1, 1938 |
| 2,129,828 | Dunn | Sept. 13, 1938 |
| 2,129,886 | Syrovy | Sept. 13, 1938 |
| 2,161,143 | Doe et al. | June 6, 1939 |
| 2,241,701 | Doe | May 13, 1941 |
| 2,248,449 | Dudley | July 8, 1941 |
| 2,292,125 | Ifield | Aug. 4, 1942 |
| 2,299,233 | Hoffer | Oct. 20, 1942 |
| 2,300,009 | Rose | Oct. 27, 1942 |
| 2,331,694 | Jeffrey | Oct. 12, 1943 |
| 2,484,337 | Ferris | Oct. 11, 1949 |

UNITED STATES PATENT OFFICE

CERTIFICATE OF CORRECTION

Reissue No. 24,048 August 2, 1955

Fred J. Wright

It is hereby certified that error appears in the printed specification of the above numbered patent requiring correction and that the said Letters Patent should read as corrected below.

Column 2, line 49, for "cylindrically [cylindrical]" read --cylindrical [cylinderical]--; column 3, line 70, for "36" read --35--; column 6, line 68, for "a shaft" read --said shaft--; column 7, line 18, for "pheroidally" read --spheroidally--.

Signed and sealed this 13th day of September 1955.

(SEAL)
Attest:

KARL H. AXLINE
Attesting Officer

ROBERT C. WATSON
Commissioner of Patents